Jan. 31, 1961

M. G. KROGER 2,970,188

TELEVISION RECEIVER

Filed June 29, 1955

INVENTOR.
Marlin G. Kroger
BY Mueller & Aichele

Attys.

United States Patent Office 2,970,188

Patented Jan. 31, 1961

2,970,188

TELEVISION RECEIVER

Marlin G. Kroger, Oak Park, Ill., assignor to Motorola, Inc., Chicago, Ill., a corporation of Illinois Filed June 29, 1955, Ser. No. 518,835

3 Claims. (Cl. 178—7.3)

Figures 1, 2:
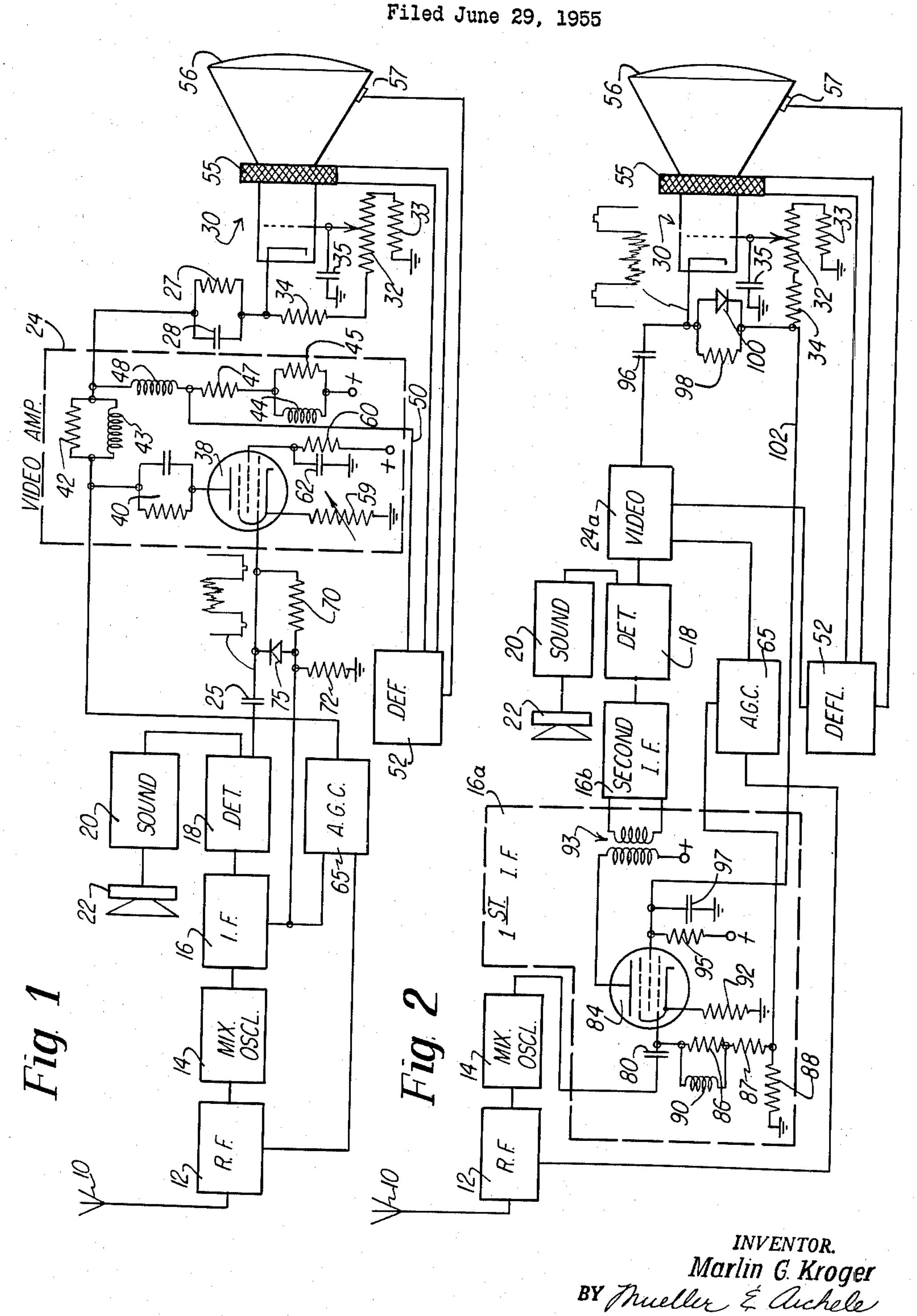

This invention relates to television receivers and more particularly to direct current reinsertion systems for such receivers.

The usual television signal includes a video carrier which is amplitude modulated according to the brightness of the televised scene as the equipment at the transmitter repeatedly scans the scene. The cathode ray beam at the receiver is scanned in synchronization with the scanning operation of the transmitter by means of sync pulses of constant amplitude included with the picture information at spaced time intervals. Therefore, the cathode ray electron beam in the receiver cathode ray tube may be varied in intensity according to the modulation and scanned across the screen in correspondence to the transmitting operations to reproduce the original scene.

It is usual that cutoff of the cathode ray tube in the receiver corresponds to black on the screen and increased intensity of the electron beam up to maximum correspondingly produces lighter shades. Thus one scanning line of a white object against a black background on the screen would be formed by a video signal of constant amplitude which cuts off the cathode ray tube to provide the black, with a portion of the signal being of different amplitude to cause high conduction in the tube thus forming the white object. In a scene with a white object against a gray background, the signal would be similar except that the portion of the constant amplitude would be above cutoff of the cathode ray tube. However, the signal applied to the tube is generally on an alternating current axis since there are direct current blocking elements between the receiver detector and the cathode ray tube. Accordingly the alternating current axes of the signals just described might differ by such a small amount that in the second case there would appear merely a gray object against a black background instead of a white object against a gray background. Thus when the signal is on such an alternating current axis, the axis depends on the wave form which may or may not cause energization of the electron beam to give faithful tone representation on the screen. In many television receivers it is desirable to place the video signal on a D.C. axis by a restoring system so that all signals are applied to the cathode ray tube in proper relation above cutoff of the tube.

A common procedure is to use the synchronizing pulses, which are of constant amplitude, as a reference and to apply the modulated video signal to the cathode ray tube in the same relative amplitude relation to the synchronizing pulses as it had when transmitted. Thus, if the pulses represent black, that is, cutoff or below cutoff of the cathode ray tube; they may become a standard for black, even if there is no black represented in the particular scene. In such a system the relative amplitudes of the components of the signal would not matter, nor would it matter how much of a given amplitude happened to be in the transmitted video signal.

A known system of D.C. restoration or reinsertion is one employing a clamper circuit at a point in direct current relation with the input to the cathode ray tube. For example, if the synchronizing pulses are positive going at the grid of the valve in the final video amplifier which is D.C. coupled to the cathode ray tube, that is, if the pulses oppose the bias on the valve and tend to cause increased conduction thereof, a grid clamper circuit in this video amplifier may provide automatic biasing of the stage according to the synchronizing pulse level. However, if the pulses are negative going, which may be the case depending on detector polarity and the number of video amplifier stages, clamping to the pulses can not be obtained by using the grid of the video amplifier. If a separate diode clamper were used, it would require a negative bias potential at which to clamp. This has not been entirely practical in the prior art because such a potential would bias the video amplifier stage as well, thereby reducing the gain of this stage, which is particularly undesirable in the case of weak signals.

Accordingly, it is an object of this invention to provide an improved direct current restoration circuit for a television receiver which utilizes an electron discharge device at which the signals of reference or restoration level are applied to the device in a manner to reduce the conduction thereof and which circuit permits substantially full gain of the discharge device to be realized at all signal levels.

A further object of the invention is to provide a television receiver incorporating an improved system for providing automatic D.C. reinsertion of a video signal at the control element of an electron discharge device in the video amplifier stage of the receiver when the synchronizing or reference pulses applied thereto are negative going, while maintaining high gain of the stage at weak signal levels.

It is also an object of this invention to furnish such an improved reinsertion system which is operable when the synchronizing pulses are applied in a positive going sense to the cathode element of the cathode ray image reproducing tube without sacrificing gain in the reproducing tube.

A feature of the invention is the provision of a clamper system in the input circuit to the control electrode of a video amplifier tube, which amplifier is D.C. coupled to the cathode ray tube in a television receiver, the clamper being negatively biased and caused to clamp to a potential derived from the automatic gain control system of the receiver; thus providing a bias varying with the received signal level and permitting substantially optimum gain of the amplifier at all signal levels.

Another feature of the invention is the provision of a clamper system in the input circuit to the emission element of a cathode ray image reproducing tube as used in a television receiver, with the clamper being positively biased by a potential appearing at an output element of a stage in the receiver, the gain of which is controlled by an automatic gain control circuit so that the restoration level of the clamper system may be varied in accordance with the strength of a signal in the receiver.

Further objects, features and the attending advantages thereof will be apparent upon consideration of the following description when taken in conjunction with the accompanying drawing in which:

Fig. 1 is a schematic representation of a television receiver incorporating the invention; and Fig. 2 is a schematic diagram of a modification of the invention.

In practicing the invention there is provided a direct current restoration or reinsertion system for a television receiver. The system is incorpated in the receiver at a point where the reference or synchronizing pulses (which provide a reference level for reinsertion), are applied to an electron discharge device in a direction to reduce the conduction thereof or to drive an input element of the device in a direction to increase the bias thereof. The system includes an input capacitor and a clamping diode shunted by a resistor coupled to the capacitor. The circuit is arranged to conduct and charge the capacitor when the synchronizing pulses are applied thereto, and the capacitor is connected to an input element of the discharge device at which reinsertion is to be provided. In addition, the diode, and thus the discharge device, is biased by means of a potential which is related to the strength of the received signal so that the system effectively clamps to this potential level. Such a bias may be provided by the automatic gain control system of the receiver when the reinsertion system is used at the grid of a video amplifier tube in which case the potential supplied by the automatic gain control circuit is generally of a suitable value to be applied to the video amplifier tube. Or if the reinsertion system is included in a cathode circuit of the image reproducing tube, it is possible to apply a bias to the diode from the screen grid element of a discharge device in the receiver, the conduction or gain of which is controlled by the automatic gain control circuit in the receiver. At such a screen grid element there is available a potential suitable for biasing the diode in a positive direction as the level of the received signal increases. Accordingly, in either of the described forms of the invention, the restoring system is regulated or biased to clamp at a potential related to the level of the received signal so that the electron discharge device at which the signal is restored will be operated at or near optimum bias at all times.

A description of the invention will now be given in connection with Fig. 1 which illustrates schematically an embodiment of the invention. Antenna 10 is shown coupled to the radio frequency amplifier circuit 12 which selects and amplifies a received television signal and applies such signal to the mixer oscillator circuit 14 where the signal is converted to an intermediate frequency. Such an intermediate frequency signal is then applied to the intermediate frequency amplifier circuit 16 for further amplification and selection after which it is demodulated in detector circuit 18, and the portion carrying the sound information is applied to the sound circuit 20 in order to drive loudspeaker 22 in accordance with this sound information. Circuit 18 also applies the video portion of the received signal to the video amplifier circuit 24 through capacitor 25. The output of amplifier circuit 24 is applied through the parallel combination of resistor 27 and capacitor 28 to the cathode of the cathode ray tube 30. A control grid in the tube 30 is connected to the arm of a potentiometer 32, one end of which is grounded through resistor 33 and the other end of which is connected to the cathode through resistor 34. The arm of potentiometer 32 is by-passed to ground through capacitor 35.

Video amplifier circuit 24 includes amplifier tube 38 having an anode at which the video signal appears and from which the signal is conducted to the cathode of cathode ray tube 30 through intermediate frequency filter 40, through the parallel combination of resistor 42 and inductor 43, and through the parallel combination of resistor 27 and capacitor 28. Operating potential for the anode of tube 38 is supplied by way of parallel connection of inductor 44 and resistor 45, and through resistor 47 and inductor 48, the inductor 48 being connected to the junction of resistors 27 and 42. At the junction of resistor 47 and inductor 48, a lead 50 supplies the video signal to the deflection circuit 52 which produces suitable beam deflection signals synchronized with the synchronizing pulses of the video signal. Circuit 52 applies the beam deflection signals to deflection yoke 55 which is disposed on the neck of the cathode ray tube 30. In accordance with these signals an electron beam is scanned across the screen 56 of the tube 30 in a manner well understood in the art. Deflection circuit 52 also supplies a high voltage accelerating potential which is applied to the anode of tube 30 at the connector 57.

Video amplifier circuit 24 includes a contrast control in the form of a variable resistor 59 connected between the cathode of tube 38 and ground. The screen grid element of tube 38 is supplied with a positive potential through a screen dropping resistor 60, and this element is bypassed to ground through capacitor 62. It may also be noted that a potential dividing system is established between the positive potential source and ground through the resistors 33, 32, 34, 27, inductor 48 and resistors 47 and 45. Variable resistor 32 thus provides a brightness control for the cathode ray tube 30 by furnishing a fixed potential to the control grid of tube 30 which thus sets the bias on that tube.

An automatic gain control circuit 65 is also provided for the receiver and this is shown connected to the junction of filter 40 and the combination of resistor 42 and inductor 43. The output of circuit 65 is a negative voltage proportional to the intensity of the received signal, and this voltage may be applied to the RF amplifier circuit 12 and the IF amplifier circuit 16. Circuits 12 and 16 may include electron tubes, the gains of which are inversely proportional to the magnitude of the potential applied thereto from the control circuit 65. Accordingly, the amplification of these stages will be reduced when stronger signals are being translated by the receiver. This operation is well known in the art, and further explanation herein is believed unnecessary.

The circuit of Fig. 1 includes a further provision which is understood in the art, and that is a delaying system for the control signal applied to tht RF amplifier circuit 12 so that this circuit operates at full gain until the translated signal reaches a predetermined value, at which point a further increase in signal level reduces the gain of that circuit. Such a delaying system permits maximum gain to be realized from RF amplifier circuit 12 when the signal level is low and such a gain is desirable. On the other hand, it is contemplated that the signal applied to the intermediate frequency amplifier circuit 16 has no delay incorporated therewith, that is, that control signal is to be developed strictly in accordance with the level of the translated signal. This control potential is also applied to the control grid element of tube 38 in the video amplifier 24 through resistor 70. A return to ground is made for this grid element through resistoı 72 which is connected between ground and resistor 70.

It may also be seen that a diode 75 is connected across resistor 70. This diode (poled to have its cathode connected to the grid element of tube 38), together with capacitor 25 and resistor 70, provide a clamping circuit. Accordingly with the video signal applied to the control element 38 having a wave form wherein the synchronizing pulses are negative going, that is, of a polarity tending to cause decreased conduction of tube 38, diode 75 will conduct on the peaks of these pulses. However, the control potential from the automatic gain control circuit 65 is applied to the anode element of diode 75 so that the diode may conduct only when the pulses exceed this control potential. Accordingly when the diode 75 does conduct, it will charge capacitor 25 so that the potential existing thereacross together with the bias or control potential from circuit 65 will bias the control element of tube 38 the proper amount to prevent this element from going positive with the applied signal. In brief, the operation of the clamping circuit comprised of resistor 70, diode 75 and capacitor 25 with its connection to the gain control circuit 65, is that it clamps the negative going synchronizing pulses of the applied signal to the level of the negative potential produced by circuit 65.

As previously pointed out, the control potential from the circuit 65 varies inversely with the signal level so that this potential will have a small negative value when the signal level is small and the gain of amplifier tube 38 may be at its maximum. However, when the level of the received signal is great, the control potential from circuit 65 will have a comparatively large negative value, thus biasing the tube 38 to a point for lesser gain while at the same time biasing the clamping circuit so that this circuit clamps the signal to a low enough value that the control element of tube 38 does not rise above zero.

Fig. 2 illustrates a further embodiment of the invention in which portions of the circuit corresponding to those of Fig. 1 are numbered the same. In this version the intermediate frequency amplifier circuit is shown as consisting of a portion 16A, shown in detail, and a further portion 16B. The television signal, converted to the intermediate frequency, is applied through capacitor 80 to the control grid element of amplifier tube 84 in the circuit 16A. A D.C. path to ground is provided for the grid element of tube 84 through resistors 86, 87 and 88. Automatic gain control circuit 65 is coupled through resistors 86 and 87 to control tube 84. An inductor 90 is shown connected across resistor 86 and the applied signal is developed across this inductor. The cathode element of tube 84 is connected to ground through a biasing resistor 92, and the anode of the tube is coupled to B+ through a winding of the output transformer 93. The screen grid element of tube 84 is coupled to the positive potential source through screen resistor 95. Capacitor 97, also connected to the screen element, bypasses this element to ground.

The television signal is supplied from output transformer 93 to the succeeding stages of the receiver including a video amplifier circuit 24[a] from which the demodulated signal is applied through capacitor 96 to the cathode element of the cathode ray tube 30. In this version of the television receiver, potentiometer 32 provides the brightness control for the cathode ray tube 30 since it is a part of a voltage dividing network comprised of resistors 33, 32, 34 and 95 connected between ground and the positive potential source. The cathode of cathode ray tube 30 is connected through resistor 98 to the screen grid of the tube 84 in the intermediate frequency amplifier circuit 16A.

In a version of the circuit shown in Fig. 2, it is contemplated that the video signal applied to the cathode of the tube 30 will include positive going sync pulses. Therefore, in order to provide suitable clamping of this signal, diode 100 is connected across resistor 98 with the anode thereof connected to the cathode of tube 30. It should be pointed out that the signals applied in this manner will tend to reduce the conduction of tube 30, that is, they are applied in the same manner as a bias is applied to this tube. Thus it may be seen that as a positive going sync pulse is applied to diode 100, this diode will conduct and charge the capacitor 96 in order to effectively clamp the level of the signal applied to the cathode of tube 30. However, the clamping circuit composed of resistor 98, capacitor 96 and diode 100 is biased through the lead 102 which is returned to the screen grid of tube 84 in a circuit 16A, and the video signal applied to the cathode ray tube will be clamped to the potential appearing at this screen grid element. Furthermore, it may be seen that the bias on tube 84 is controlled by the automatic gain control circuit 65. Accordingly, when a strong signal is translated by the system, tube 84 will be biased to reduced conduction by the control circuit 65 thus causing an increase in potential at its screen grid. This increased potential will be the level at which the signal applied to the cathode of tube 30 is clamped by the described clamping circuit. Similarly when the level of a translated signal is small, the potential at the screen grid of tube 84 will rise, and the video signal applied to the cathode ray tube will be clamped at a somewhat smaller value. Accordingly the clamping level is a function of the signal strength of the received signal and is in direct proportion thereto so that maximum gain of the tube may be obtained for different signals.

Thus this invention provides an improved clamping circuit for maintaining the video signal at a selected direct current level for application to the cathode ray image reproducing tube in the receiver. The direct current component of the video signal is therefore restored and the video signal is applied to the cathode ray reproducing tube 30 in the same relation to its synchronizing pulse portions as it had at the transmitter. Accordingly the average content of the picture information will not influence the bias on the cathode ray tube and the reproduced picture will appear as transmitted. Furthermore, direct current restoration or reinsertion is accomplished at a point in the receiver where the applied sync pulses, to which the clamping circuit is responsive, tend to reduce the conduction of an associated electron valve. However, with the provision of a variable clamping level which is dependent upon signal level, the gain of the electron valve is not reduced below the optimum level for the signal level.

I claim:

1. In a television receiver which utilizes a received carrier signal modulated by synchronizing components of reference level and video components, a system for maintaining the synchronizing components at a reference level related to the strength of the received carrier signal, including in combination signal translating means for utilizing the synchronizing components and the video components including an electron discharge valve to which the synchronizing components are applied with a polarity to cause decreased conduction thereof, clamping circuit means coupled to said electron discharge valve and including a storage capacitor, resistor means and a diode, said signal translating means applying the synchronizing components to said clamping circuit means so that the same develops a control potential directly related to the level of the synchronizing components, automatic gain control circuit means to develop a regulating potential related to the strength of the received carrier signal for gain control of said receiver, means coupling said automatic gain control circuit means to said clamping circuit means to establish the clamping level thereof as determined by the level of the received carrier signal.

2. In a television receiver which utilizes a received carrier signal modulated by synchronizing components of reference level and video components, a system for maintaining the synchronizing components at a reference level related to the strength of the received carrier signal, including in combination signal translating means for utilizing the synchronizing components and the video components including an electron discharge valve having a control grid to which negative going synchronizing components are applied to reduce the conduction of said valve, clamping circuit means coupled to said electron discharge valve and including a storage capacitor, resistor means, and a diode, said signal translating means applying the synchronizing components to said clamping circuit means so that said clamping circuit means develops a control potential directly related to the level of the synchronizing components, automatic gain control circuit means to develop a regulating potential related to the strength of the received carrier signal for gain control of said receiver, means coupling said automatic gain control circuit means to said clamping circuit means to establish the clamping level thereof as determined by the level of the received carrier signal.

3. In a television receiver which utilizes a received carrier signal modulated by synchronizing components of reference level and video components, a system for maintaining the synchronizing components at a reference level related to the strength of the received carrier signal, including in combination signal translating means for utilizing the synchronizing components and the video components including a cathode ray tube having a cathode to which positive going synchronizing components are applied to reduce the conduction of said tube, clamping circuit means coupled to said tube and including a storage capacitor, resistor means, and a diode, said signal translating means applying the synchronizing components to said clamping circuit means so that the same develops a control potential directly related to the level of the synchronizing components, automatic gain control circuit means to develop a regulating potential related to the strength of the received carrier signal for gain control of said receiver, means coupling said automatic gain control circuit means to said clamping circuit means to establish the clamping level thereof as determined by the level of the received carrier signal.

References Cited in the file of this patent

UNITED STATES PATENTS

| | | |
|---|---|---|
| 2,240,600 | Applegarth | May 6, 1941 |
| 2,259,538 | Wheeler | Oct. 21, 1941 |
| 2,265,883 | Applegarth | Dec. 9, 1941 |
| 2,476,523 | Wright | July 19, 1949 |
| 2,675,423 | Kirkness | Apr. 13, 1954 |
| 2,718,550 | Hoyt et al. | Sept. 20, 1955 |